(12) United States Patent
Shimizu et al.

(10) Patent No.: US 9,215,013 B2
(45) Date of Patent: Dec. 15, 2015

(54) RECEPTION APPARATUS AND ELECTRONIC EQUIPMENT (71) Applicant: Sony Corporation, Tokyo (JP)

(72) Inventors: Hiroyuki Shimizu, Saitama (JP); Tomonori Nakajima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/201,086

(22) Filed: Mar. 7, 2014

(65) Prior Publication Data

US 2014/0273876 A1 Sep. 18, 2014

(30) Foreign Application Priority Data

Mar. 15, 2013 (JP) ................................. 2013-053130

(51) Int. Cl.
*H04B 17/00* (2015.01)
*H04B 17/345* (2015.01)

(52) U.S. Cl.
CPC ............ *H04B 17/005* (2013.01); *H04B 17/345* (2015.01)

(58) Field of Classification Search
CPC ...................................................... H04B 17/005
USPC ........................................................ 455/67.13
See application file for complete search history.

(56) References Cited

U.S. PATENT DOCUMENTS 5,974,101 A * 10/1999 Nago ............................ 375/350
7,028,114 B1 * 4/2006 Milan et al. .................... 710/100

FOREIGN PATENT DOCUMENTS

JP 2009-188515 A 8/2009

* cited by examiner

*Primary Examiner* — Eugene Yun
(74) *Attorney, Agent, or Firm* — Sheridan Ross P.C.

(57) ABSTRACT

A reception apparatus includes a plurality of reception circuits that receive transmission signals, a plurality of local oscillation circuits that respectively supply the plurality of reception circuits with local oscillation signals, and a control unit that controls tunings in the plurality of reception circuits. When at least one reception circuit among the plurality of reception circuits is not used to receive the transmission signals, the control unit searches for an interference wave using the unused reception circuit.

12 Claims, 11 Drawing Sheets

SEARCH ALGORITHM 1

SEARCH ALGORITHM 2

SEARCH ALGORITHM 3

RECEPTION APPARATUS AND ELECTRONIC EQUIPMENT

CROSS REFERENCE TO RELATED APPLICATIONS

This application claims the benefit of Japanese Priority Patent Application JP 2013-053130 filed Mar. 15, 2013, the entire contents of which are incorporated herein by reference.

BACKGROUND

The present disclosure relates to a reception apparatus that receives a transmission signal such as a television broadcast signal, and electronic equipment including the reception apparatus.

In recent years, apparatuses including a plurality of reception circuits are developed as television receivers or recording apparatuses which have reception circuits which receive television broadcast. For example, the television receives including the plurality of reception circuits can simultaneously display received images from a plurality of channels on display screens. Further, the recording apparatuses including the plurality of reception circuits can simultaneously record broadcast signals from a plurality of channels on display screens.

Figure 11:
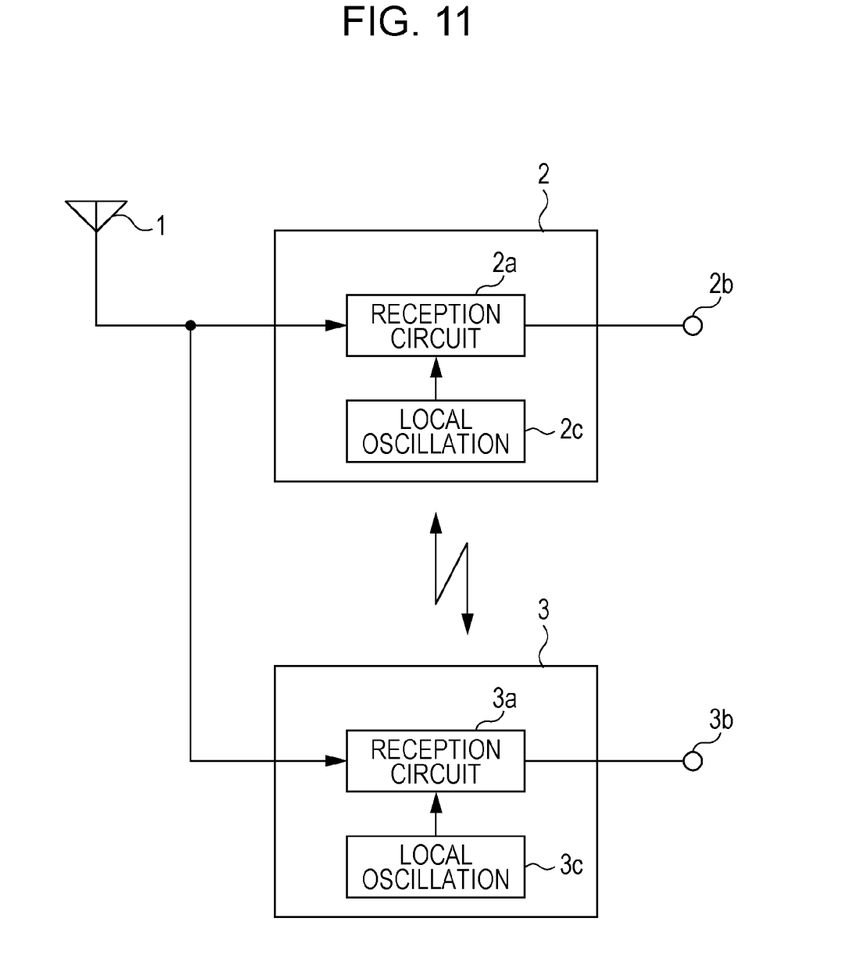
FIG. 11 is a circuit diagram showing an example of a reception apparatus in the related art.

FIG. 11 is a diagram showing an example of an apparatus including a plurality of reception circuits in the related art.

A signal received from an antenna 1 is supplied to first and second tuner units 2 and 3. The first and second tuner units 2 and 3 respectively include reception circuits 2a and 3a. Each of the reception circuits 2a and 3a receives a broadcast signal of a specific channel (frequency). The channel received by each of the reception circuits 2a and 3a is determined by, for example, an instruction from a control unit (not shown) in the apparatus.

Each of the reception circuits 2a and 3a obtains a baseband signal or an intermediate frequency signal which is obtained by converting the broadcast signal. In order to obtain such a baseband signal or an intermediate frequency signal, a frequency signal (local oscillation frequency signal) is necessary which is mixed with the reception signal in a mixer (not shown) in the reception circuits 2a and 3a. The local oscillation frequency signal to be mixed with the reception signal in the mixer is obtained by local oscillation circuits 2c and 3c which are embedded in the respective tuner units 2 and 3.

Each of the reception circuits 2a and 3a performs a demodulation process of the baseband signal or the intermediate frequency signal. A video signal and an audio signal which are obtained by the demodulation process are obtained in the output terminals 2b and 3b of the reception circuits 2a and 3a.

In Japanese Unexamined Patent Application Publication No. 2009-188515, a technology is described which stops an operation of an unused reception circuit so as to avoid an interference wave from occurring, in a system including a plurality of reception circuits.

SUMMARY

However, when a tuner unit performs reception, it is preferable that reception is performed without being affected from an interference wave from outside. Therefore, for example, a processing of accommodating the components which configures the tuner unit in a shield case or the like has been performed in the past, but it is difficult to completely prevent the arrival of the interference wave.

Particularly, in recent years, communication devices of various standards which deal with a relatively high frequency, such as communication devices for a wireless Local Area Network (LAN) have become widespread. For this reason, a signal of a frequency similar to a frequency signal handled by an oscillation circuit, which generates a local oscillation signal and is connected to the tuner unit for a television broadcast signal, arrives from outside of the receiving device, so that fear of deteriorating the reception performance of the receiver is high.

It is desirable to provide a reception apparatus and electronic equipment which are capable of effectively detecting the arrival of the interference wave from outside.

According to an embodiment of the present disclosure, there is provided a reception apparatus including a plurality of reception circuits that receive transmission signals, a plurality of local oscillation circuits that respectively supply the plurality of reception circuits with local oscillation signals, and a control unit that controls tunings in the plurality of reception circuits.

When at least one reception circuit among the plurality of reception circuits is not used to receive the transmission signals, the control unit searches for an interference wave using the unused reception circuit.

According to another embodiment of the present disclosure, there is provided electronic equipment including a plurality of reception circuits that receive transmission signals, a plurality of local oscillation circuits that respectively supply the plurality of reception circuits with local oscillation signals, a control unit that controls tunings in the plurality of reception circuits, and a processing unit of a reception signal.

When at least one reception circuit among the plurality of reception circuits is not used to receive the transmission signals, the control unit searches for an interference wave using the unused reception circuit.

According to the present disclosure, in a situation when one reception circuit among a plurality of reception circuits which are prepared does not receive a transmission signal, the unused reception circuit is to perform a search of an interference wave.

According to the present disclosure, since the unused reception circuit among the plurality of reception circuits which are prepared performs the search of the interference wave, it is possible to preferably perform a search of an interference wave in the vicinity, with a simple configuration that does not ask for a dedicated circuit for searching an interference wave.

DETAILED DESCRIPTION OF EMBODIMENTS

Figure 1:
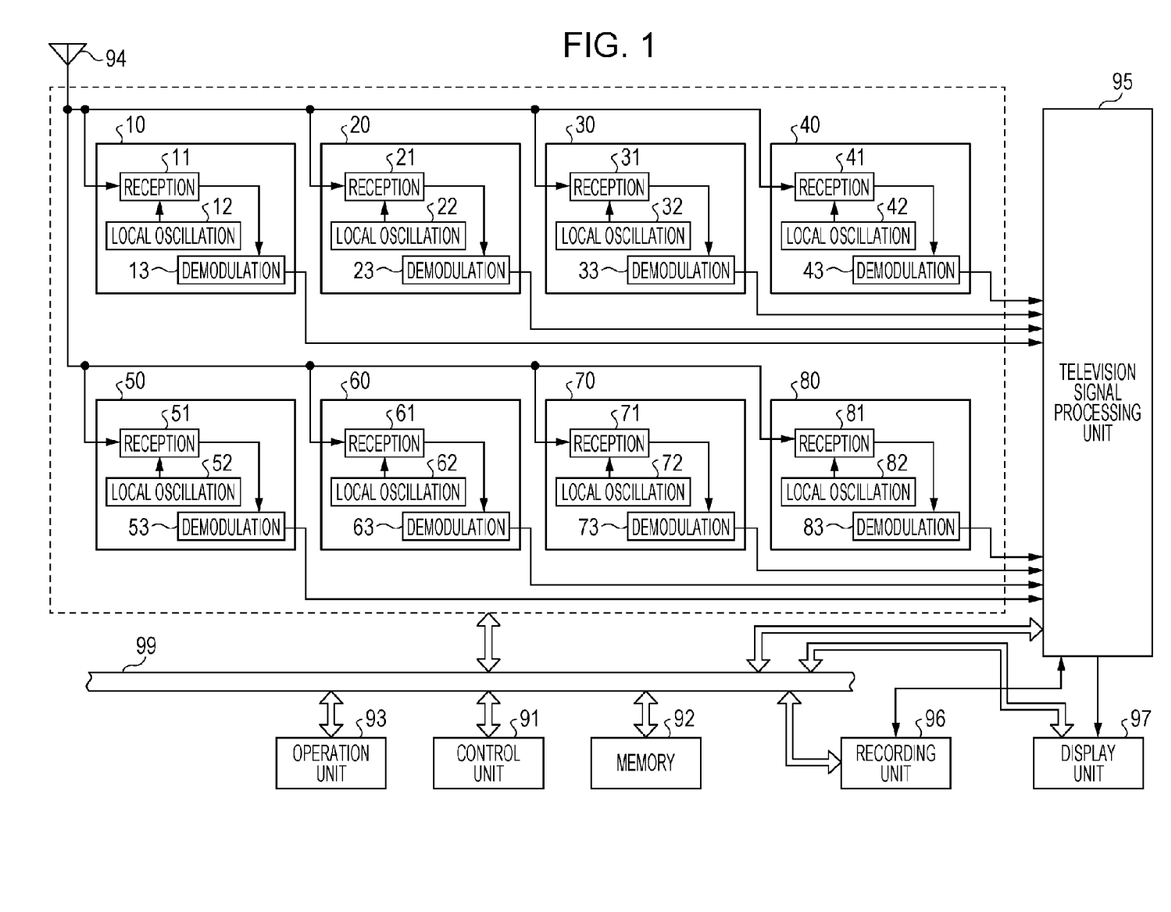
FIG. 1 is a block diagram showing a configuration example of a reception apparatus according to an embodiment of the present disclosure.

Examples of a reception apparatus and electronic equipment according to embodiments of the present disclosure will be described with reference to figures in the following order:

1. Configuration Example of a Reception Apparatus (FIGS. 1 and 2)
2. Search Process Example of an Interference Wave (FIG. 3)
3. Tuning Process Example (FIG. 4)
4. Respective Examples of a Search Algorithm (FIGS. 5 to 10)
5. Modification Example 1. Configuration Example of a Reception Apparatus FIG. 1 is a diagram showing a configuration example of a reception apparatus according to an example of an embodiment of the present disclosure.

The reception apparatus according to the embodiment of the present disclosure is an apparatus of receiving a television broadcast signal, and includes a plurality of (in this example, eight) tuner units 10, 20, 30, 40, 50, 60, 70, and 80. The signals received in an antenna 94 are supplied to the tuner units 10 to 80.

Each of the tuner units 10 to 80 is disposed on a substrate or the like in a predetermined arrangement. The example of FIG. 1 shows a case in which eight tuner units 10 to 80 are arranged in two rows in the vertical direction as well as arranged in a four-by-four arrangement in the horizontal direction. However, the arrangement is only an example and other arrangements may be used. For example, eight tuner units 10 to 80 may be arranged in a row.

Respective tuner units 10 to 80 include reception circuits 11, 21, 31, 41, 51, 61, 71, and 81, respectively, and each of the reception circuits 11 to 81 receives a transmission signal (broadcast signal) of a specific channel (frequency). The frequency received by each of the reception circuits 11 to 81 is set by a local oscillation signal which is supplied from each of local oscillation circuits 12, 22, 32, 42, 52, 62, 72, and 82 which are included in respective tuner units 10 to 80. The frequency received by each of the reception circuits 11 to 81 is determined according to an instruction from a control unit 91. The generation status of the local oscillation signal in each of the local oscillation circuits 12 to 82 is also determined according to the instruction from the control unit 91. The control unit 91 can communicate with each of the tuner units 10 to 80 through a bus line 99.

For example, when an instruction of tuning a specific channel is arrived from an operation unit 93, the control unit 91 instructs one specific tuner unit (for example, first tuner unit 10) among the tuner units 10 to 80 to receive a corresponding channel. In this case, the control unit 91 searches for a frequency through which a reception channel is transmitted, using one search algorithm selected among a plurality of search algorithms stored in the memory 92. In addition, the details of a plurality of search algorithms will be described later.

Each of the reception circuits 11 to 81 acquires a baseband signal or an intermediate frequency signal obtained by performing a frequency-conversion on the broadcast signal using a reception process. Demodulation circuits 13, 23, 33, 43, 53, 63, 73, and 83 which are respectively connected to the respective reception circuits 11 to 81 perform a demodulation process of the baseband signal or the intermediate frequency signal. Video signals and audio signals obtained by the demodulation process in the demodulation circuits 13 to 83 are supplied from respective tuner units 10 to 80 to the television signal processing unit 95.

The video signals and the audio signals which are processed in the television signal processing unit 95 are supplied to and recorded in the recording unit 96. Further, the video signals which are processed in the television signal processing unit 95 are supplied to and displayed on the display unit 97. For example, when the recording unit 96 records eight different channels at the same time, by an instruction from the control unit 91, each of the eight tuner units 10 to 80 performs a reception operation of respectively instructed channel. According to the number of channels which are received at the same time, the control unit 91 stops the reception operation of a tuner unit which does not ask for a reception operation (any one of the tuner units 10 to 80).

Each of eight tuner units 10 to 80 are separately formed into an integrated circuit and disposed on a circuit substrate in a predetermined arrangement. Alternatively, eight tuner units 10 to 80 may be formed into one integrated circuit. In the example of the present embodiment, all frequency bands received by eight tuner units 10 to 80 are the same.

In addition, in the example of FIG. 1, although each of the tuner units 10 to 80 is intended to perform the demodulation process on the reception signal, each of the tuner units 10 to 80 may be configured not to perform the demodulation process. In other words, a processing unit which is connected to the rear stage of each of the tuner units 10 to 80 may perform the demodulation process on the baseband signal or the intermediate frequency signal which are output by each of the tuner units 10 to 80.

Figure 2:
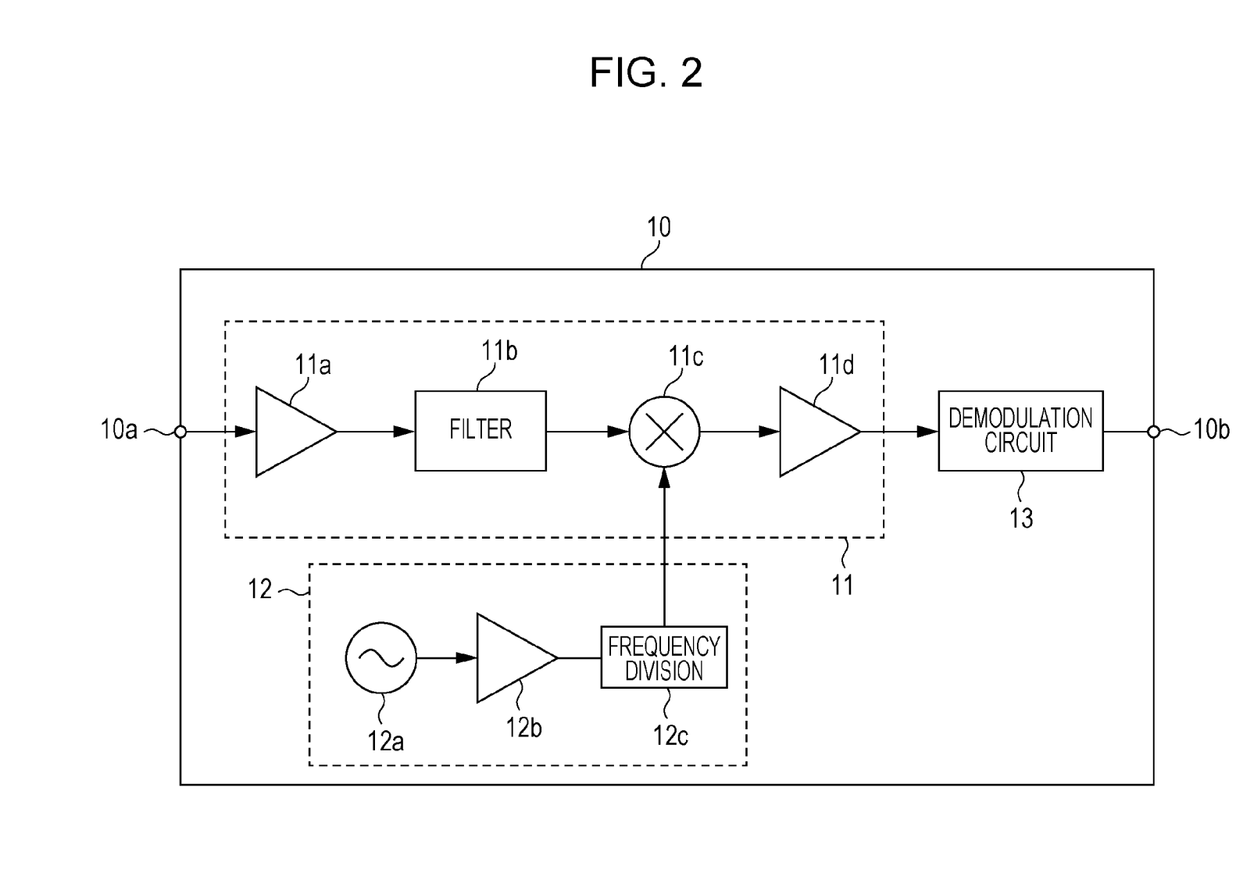
FIG. 2 is a block diagram showing an example of a reception circuit of the embodiment of the present disclosure.

FIG. 2 is a diagram showing an example of a configuration of the first tuner unit 10. The second tuner unit 20 to eighth tuner unit 80 have the same configurations as that of the first tuner unit 10.

The reception circuit 11 includes an amplifying circuit 11a that amplifies a high frequency signal which is a transmission signal obtained in the input terminal 10a, a filter 11b that performs a band limitation of the high frequency signal that is amplified by the amplifying circuit 11a, and a mixer 11c to which the output of the filter 11b is supplied. The mixer 11c mixes the high frequency signal supplied from the filter 11b with the local oscillation signal supplied from the local oscillation circuit 12, and converts the mixed signal to a baseband signal or an intermediate frequency signal. The baseband signal or the intermediate frequency signal which is converted by the mixer 11c is supplied to a demodulation circuit 13 through an amplifying circuit 11d.

The local oscillation circuit 12 includes a voltage controlled oscillator 12a, an amplifying circuit 12b that amplifies an oscillation signal that is output by the voltage controlled oscillator 12a, and a frequency divider 12c that frequency-divides the oscillation signal which is output by the amplifying circuit 12b. The frequency of the oscillation signal that is output by the voltage controlled oscillator 12a and a frequency division ratio of the frequency division performed by the frequency divider 12c are set under the control of the control unit 91 (FIG. 1). In addition, the voltage controlled oscillator 12a and the frequency divider 12c are a part of a circuit forming a Phase Locked Loop (PLL), and performs a feedback control to stabilize the oscillation frequency. Further, since the configuration of the PLL is already known, the configuration of the PLL is omitted in FIG. 2.

The demodulation circuit 13 performs a demodulation process of the baseband signal or the intermediate frequency signal which is supplied. The video signal and the audio signal which are demodulated by the demodulation circuit 13 are supplied from the output terminal 10b to the processing unit (television signal processing unit 95 in FIG. 1) in the rear stage. A configuration in which the first tuner unit 10 includes the demodulation circuit 13 as described above is an example, but the tuner unit may be configured not to include a demodulation circuit.

2. Search Process Example of an Interference Wave

Next, under the control of the control unit 91, a process example of performing a search of an interference wave which arrives at the reception apparatus from the vicinity of the reception apparatus will be described.

Figure 3:
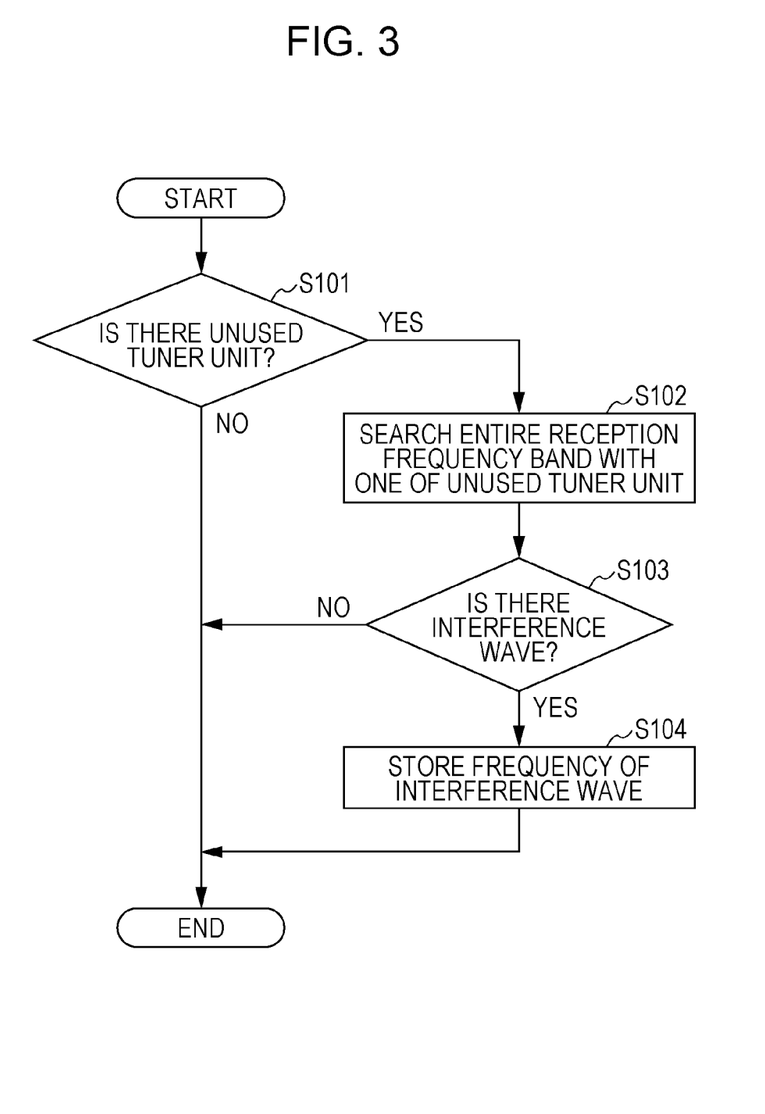
FIG. 3 is a flow chart showing a search process example of an interference wave according to the embodiment of the present disclosure.

FIG. 3 is a flow chart showing a process example when a search is performed. The search process of the interference wave shown in FIG. 3 is performed, for example, by the control unit 91 at a constant interval. The constant interval at which the search process is performed is, for example, relatively long interval such as a few hours.

First, the control unit 91 determines how many tuner units which do not receive television broadcast signal are present among a plurality of the tuner units 10 to 80 which are prepared, and determines whether or not there is a (unused) tuner unit which does not receive the television broadcast signals (step S101).

Here, when all eight tuner units 10 to 80 perform reception and thus there is no tuner unit which does not receive the television broadcast signal, the search process is ended without being performed. In this case, for example, the control unit is on standby until any one of the tuner units is in an unused state, and when any one of the tuner units is in the unused state, the control unit 91 performs again the process of the flowchart of FIG. 3.

Then, in step S101, when it is determined that there is an unused tuner unit which does not receive the television broadcast signal, the control unit 91 selects any one of the unused tuner units, and searches for all bands that can be received in the tuner unit (step S102). In the search, the control unit 91 determines whether or not a signal above a certain level is detected, which is an interference wave when the tuner units 10 to 80 receive the television broadcast signals (step S103).

In the determination, when the interference wave is not detected, the search process is ended and the control unit 91 is on standby until the next search timing.

Then in step S103, when the control unit 91 determines that the interference wave is detected, the memory 92 stores the list of the frequencies of the detected interference waves (step S104).

In addition, the stored information may be updated such that frequencies that are not detected in step S102 among frequencies of the interference waves which are stored in the memory 92 in the past are to be deleted from the list of frequencies of interference waves at the time of storing operation in step S104. Alternatively, the frequencies that are not detected may remain as the past history of the interference wave in the memory 92.

3. Tuning Process Example

Figure 4:
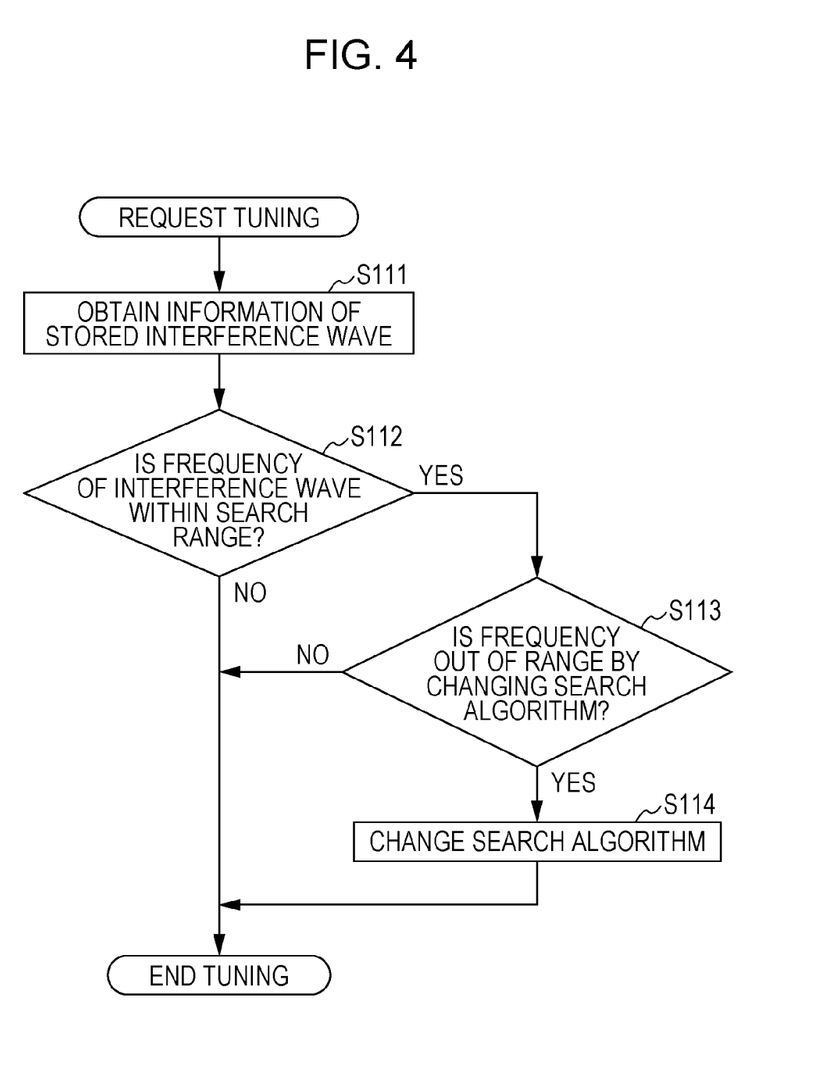
FIG. 4 is a flow chart showing a tuning process example according to the embodiment of the present disclosure.

Next, a tuning process example in which each of the tuner units 10 to 80 performs reception under the control of the control unit 91 will be described with reference to the flowchart of FIG. 4. In addition, in the case of the present disclosure, a plurality of search algorithms are set in advance as a search process when the reception frequency is searched. The specific examples of a plurality of search algorithms will be described later.

First, when there is a tuning request for a certain channel, the control unit 91 acquires information on the frequency of the interference wave from the list of interference waves which is stored in the memory 92 (step S111).

Next, the control unit 91 determines whether or not the frequency of the interference wave acquired in step S111 is within the frequency range for searching the channel having the tuning request (step S112). Here, when it is determined that the frequency of the interference wave is within the frequency range for searching, the control unit 91 determines whether or not the frequency of the interference wave is out of the frequency range for searching by changing the search algorithm (step S113).

In step S113, when it is determined that the frequency of the interference wave is out of the search frequency range by changing the search algorithm, the control unit 91 changes the search algorithm to a search algorithm in which passing through the frequency of the interference wave is avoided and searches for a channel which receives the tuning request (step S114). In addition, in step S113, when passing through the frequency of the interference wave is unavoidable even by changing the search algorithm, the search of a channel having the tuning request is performed as it is, without changing the search algorithm.

4. Respective Examples of a Search Algorithm

Next, the specific examples of the search algorithm that has been described in the tuning process example of the flowchart in FIG. 4 will be described with reference to FIGS. 5 to 10.

Here, three search algorithms, a search algorithm 1 to a search algorithm 3, will be described. The programs for executing the three search algorithms are stored in, for example, in the memory 92. Then the control unit 91 first sets any one of the three search algorithms, and a process of changing the search algorithm to another search algorithm is performed in step S114 in the flowchart of FIG. 4.

In the description regarding the following search algorithms 1 to 3, it is assumed that the first tuner unit 10 receives signals.

Search Algorithm 1

Figure 5:
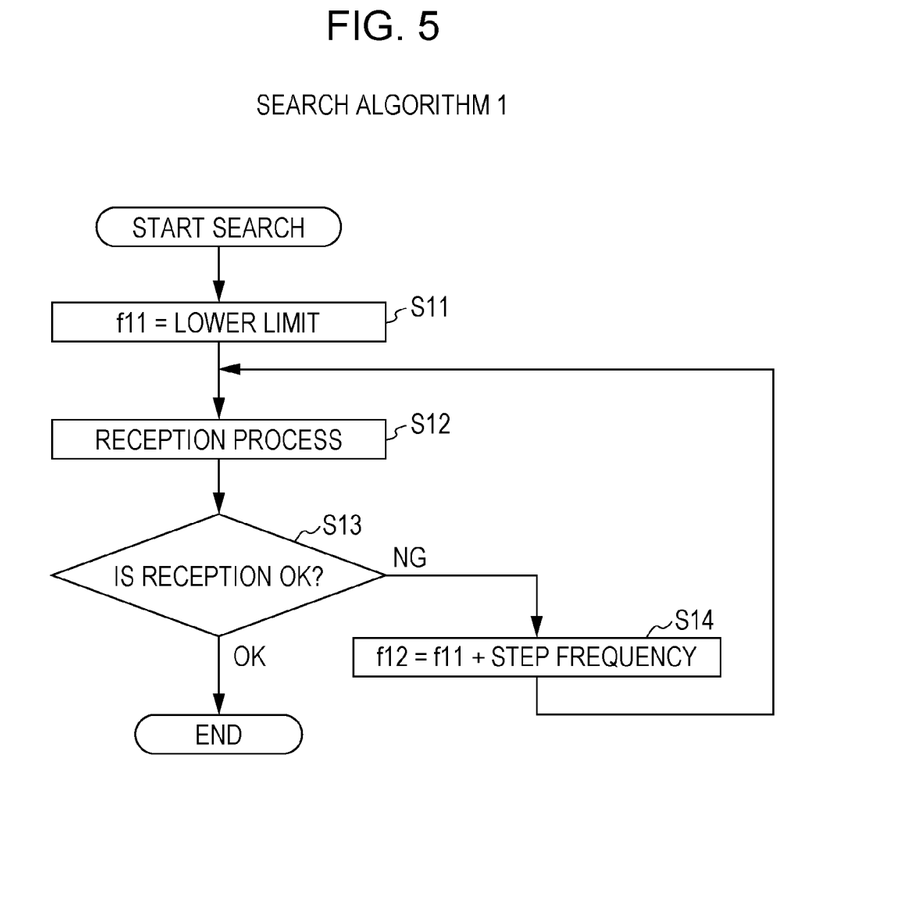
FIG. 5 is a flow chart showing an example of a search algorithm 1 according to the embodiment of the present disclosure.
Figure 6:
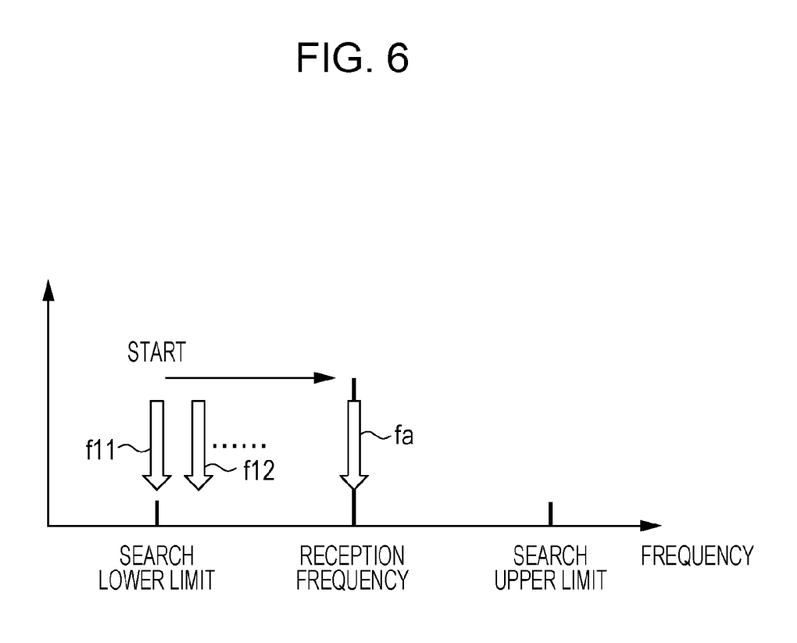
FIG. 6 is a characteristic diagram showing a process example of the search algorithm 1 according to the embodiment of the present disclosure.

FIG. 5 is a flow chart showing an example of a search algorithm 1. FIG. 6 is a diagram showing an example of a change of the reception frequency when the search algorithm 1 is performed.

The search algorithm 1 is intended to perform a linear search from a lower limit of a search range. In other words, as shown in FIG. 5, when the search algorithm 1 is performed, the control unit 91, first, determines a search range of the search of a transmission frequency of a desired channel, and sets the lower limit frequency f11 of the search range to a frequency fx to be first searched (step S11). Then, in order to receive the lower limit frequency f11, the control unit 91 sets the reception frequency in the tuner unit 10 (step S12). At this time, the control unit 91 instructs the local oscillation circuit 12 to generate a local oscillation signal of which frequency is the frequency corresponding to the lower limit frequency f11.

Then, the control unit 91 determines whether or not the broadcast signal of the desired channel in the reception process is received (step S13). In the determination, when the broadcast signal of the desired channel is received, the reception at the frequency continues and the search process is ended.

In the determination of step S13, when the broadcast signal of the desired channel is not received, the control unit 91 shifts the frequency fx to which is searched by the tuner unit 10 to the frequency f12 which is one step above the present search frequency f11 (step S14). Then, in order to receive the search frequency f12, the control unit 91 sets the reception frequency in the tuner unit 10 (step S12).

Hereinafter, until the tuner unit 10 can receive the broadcast signal of the desired channel, the control unit 91 causes the process of steps S12, S13, and S14 to be repeated. In addition, although step S14 of FIG. 5 shows the change in the search frequency from the frequency f11 to the frequency f12, the frequency that is set is changed to f12, f13, and ... one step at each time when the process of the step S14 is repeated.

FIG. 6 shows an example of a change of the reception frequency of the tuner unit 10 when the control unit 91 performs the search algorithm 1. As shown in FIG. 6, the reception frequency of the tuner unit 10 is first the lower limit frequency f11 of the search range, thereafter, changes to the frequency f12 which is one-step greater, and then is gradually increased at the same frequency interval. Then, when the broadcast signal of the desired channel is received in the tuner unit 10 at the reception frequency fa, the control unit 91 fixes the reception frequency of the tuner unit 10 to the frequency fa and ends the search process.

Search Algorithm 2

Figure 7:
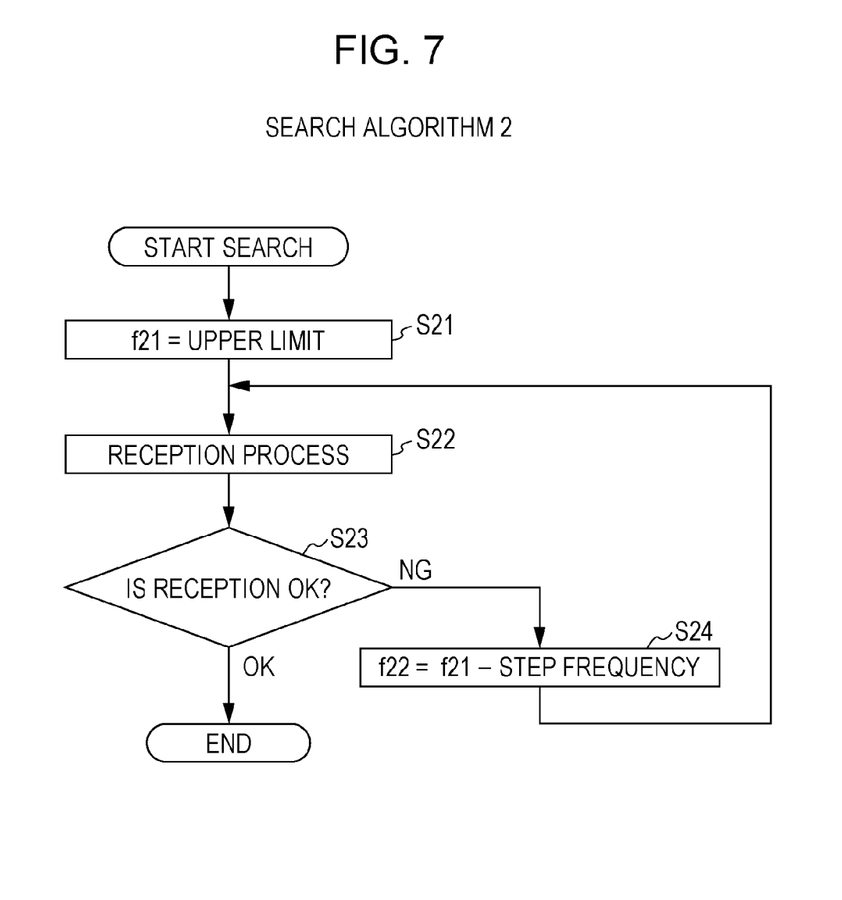
FIG. 7 is a flow chart showing an example of a search algorithm 2 according to the embodiment of the present disclosure.
Figure 8:
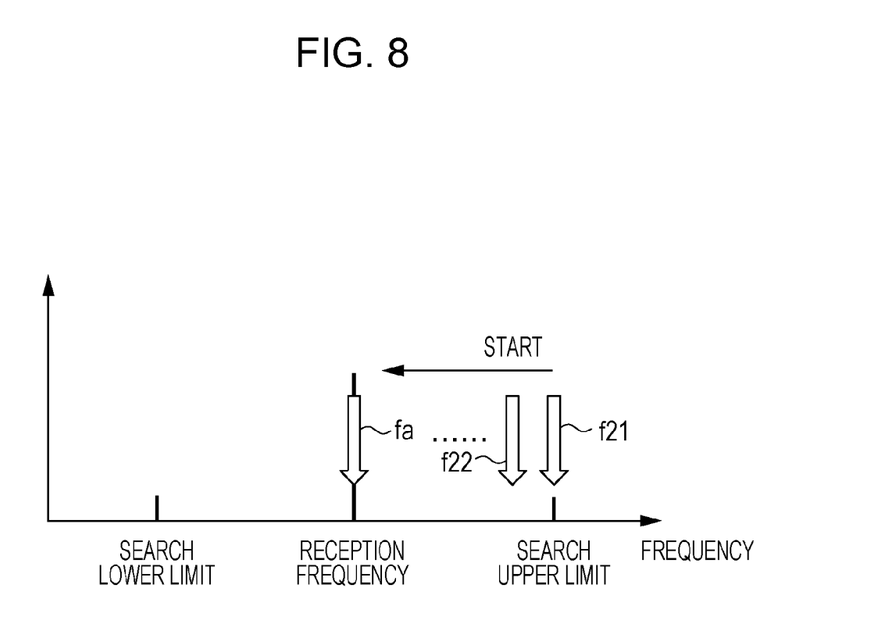
FIG. 8 is a characteristic diagram showing a process example of the search algorithm 2 according to the embodiment of the present disclosure.

FIG. 7 is a flow chart showing a search algorithm 2. FIG. 8 is a diagram showing an example of a change of the reception frequency when the search algorithm 2 is performed.

The search algorithm 2 is intended to perform a linear search from the upper limit of a search range. In other words, as shown in FIG. 7, when the search algorithm 2 is performed, the control unit 91, first, determines a search range of the search of a transmission frequency of a desired channel, and sets the upper limit frequency f21 of the search range to a frequency fx to be first searched (step S21). Then, in order to receive the upper limit frequency f21, the control unit 91 sets the reception frequency in the tuner unit 10 (step S22). At this time, the control unit 91 instructs the local oscillation circuit 12 to generate a local oscillation signal of which frequency is the frequency corresponding to the upper limit frequency f21.

Then, the control unit 91 determines whether or not the broadcast signal of the desired channel in the reception process is received (step S23). In the determination, when the broadcast signal of the desired channel is received, the reception at the frequency continues and the search process is ended.

In the determination of step S23, when the broadcast signal of the desired channel is not received, the control unit 91 shifts the frequency fx which is searched by the tuner unit 10 to the frequency f22 which is one step below the present search frequency f21 (step S24). Then, in order to receive the search frequency f22, the control unit 91 sets the reception frequency in the tuner unit 10 (step S22).

Hereinafter, until the tuner unit 10 can receive the broadcast signal of the desired channel, the control unit 91 causes the process of steps S22, S23, and S24 to be repeated. In addition, although step S24 of FIG. 7 shows the change in the search frequency from the frequency f21 to the frequency f22, the frequency that is set is changed to f22, f23, and ... one step at each time when the process of the step S24 is repeated.

FIG. 8 shows an example of a change of the reception frequency in the tuner unit 10 when the control unit 91 performs the search algorithm 2. As shown in FIG. 8, the reception frequency of the tuner unit 10 is first the upper limit frequency f21 of the search range, thereafter, changes to the frequency f22 which is one-step lower, and then is gradually reduced at the same frequency interval. Then, when the broadcast signal of the desired channel is received in the tuner unit 10 at the reception frequency fa, the control unit 91 fixes the reception frequency of the tuner unit 10 to the frequency fa and ends the search process.

Search Algorithm 3

Figure 9:
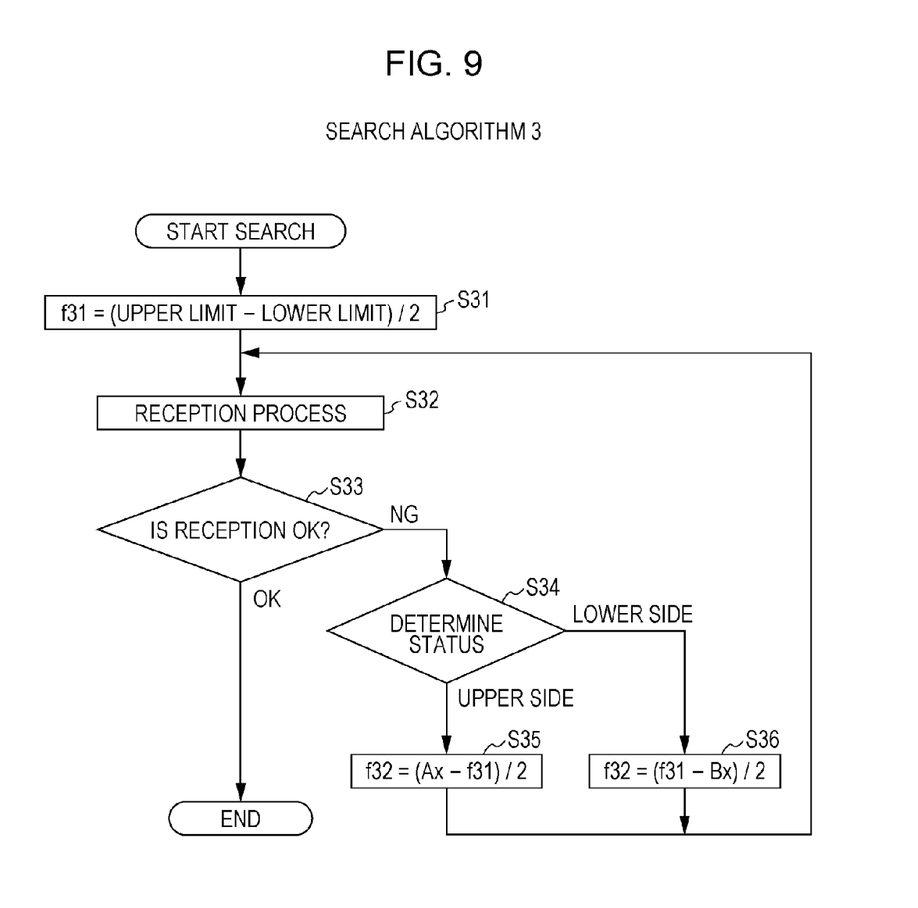
FIG. 9 is a flow chart showing an example of a search algorithm 3 according to the embodiment of the present disclosure.
Figure 10:
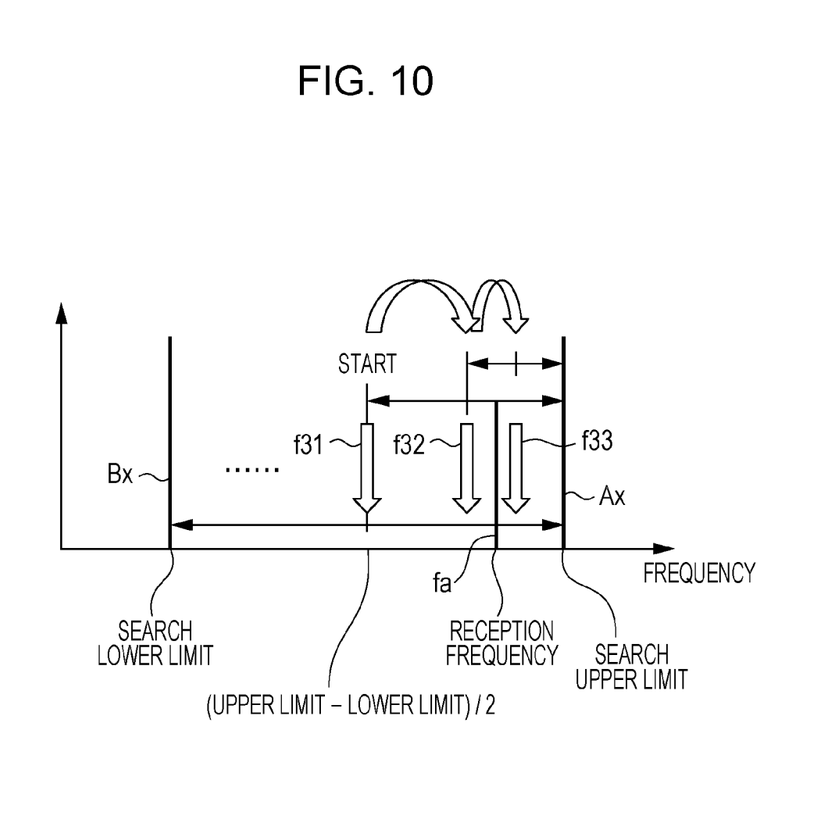
FIG. 10 is a characteristic diagram showing a process example of the search algorithm 3 according to the embodiment of the present disclosure.

FIG. 9 is a flow chart showing a search algorithm 3. FIG. 10 is a diagram showing an example of a change of the reception frequency when the search algorithm 3 is performed.

The search algorithm 3 is intended to perform a binary search from an approximate center of a search range. In other words, as shown in FIG. 9, when the search algorithm 3 is performed, the control unit 91, first, determines a search range of the search of a transmission frequency of a desired channel. Then, the control unit 91 sets the frequency f31 of the center between the lower limit frequency and the upper limit frequency of the search range to a frequency fx to be searched first (step S31). The frequency f31 of the center of the search range is calculated by (upper limit frequency Ax−lower limit frequency Bx)/2.

Then, in order to receive the upper limit frequency f31, the control unit 91 sets the reception frequency in the tuner unit 10 (step S32). At this time, the control unit 91 instructs the local oscillation circuit 12 to generate a local oscillation signal of which frequency is the frequency corresponding to the upper limit frequency f31.

Then, the control unit 91 determines whether or not the broadcast signal of the desired channel in the reception process is received (step S33). In the determination, when the broadcast signal of the desired channel is received, the reception at the frequency continues and the search process is ended.

In the determination of step S33, when the broadcast signal of the desired channel is not received, the control unit 91 determines a side of the upper side and the lower side of the present search frequency f31 on which the frequency fa to be searched is present (step S34). In the determination, when it is determined that the frequency fa is present on the upper side, the control unit 91 sets the frequency f32 to be next searched to the middle between the present search frequency f31 and the upper limit frequency Ax (step S35). The search frequency f32 at this time is calculated by (upper limit frequency Ax−search frequency f31)/2.

Further, in the determination in step S34, when it is determined that the frequency fa is present on the lower side, the control unit 91 sets the frequency f32 to be next searched to the middle between the present search frequency f31 and the lower limit frequency Bx (step S36). The search frequency f32 at this time is calculated by (search frequency f31−lower limit frequency Bx)/2.

Then, returning to step S32, the control unit 91 sets a reception frequency to the tuner unit 10 in order to receive a reception frequency f32 which is set in step S35 or step S36.

Hereinafter, the control unit 91 causes the process of steps S32 to S36 to be repeatedly executed until the tuner unit 10 can receive the broadcast signal of the desired channel so as to control the reception frequency to gradually approach the desired reception frequency. In addition, steps S35 and S36 of FIG. 7 show the change in the search frequency from the frequency f31 to the frequency f32, but at each time when the process of steps S35 and S36 is repeated, the frequency that is set is changed to approach the desired frequency in order of f32, f33, . . . .

FIG. 10 shows an example of change of the reception frequency in the tuner unit 10 when the control unit 91 performs the search algorithm 3. The example of FIG. 10 is an example in which after the reception frequency of the tuner unit 10 first becomes the frequency f31 in the center of the search range, it is determined in step S34 that the search frequency fa is above the center. In this example, the reception frequency is changed to f31, f32, and f33 to approach the frequency fa at which the broadcast signal of the channel is transmitted and finally becomes the frequency fa. At this time, the search process is ended.

In addition, a search algorithm other than the three search algorithms described so far is prepared, and thus the control unit 91 may attempt the search algorithm at the time of tuning.

As described above, according to the examples of the present disclosure, in a situation where one reception circuit of a plurality of reception circuits which are prepared does not receive the transmission signal, the unused reception circuit is to perform a search of the interference wave. Therefore, it is possible to perform a search of an interference wave in the vicinity, with a simple configuration that does not ask for a dedicated circuit for searching an interference wave. When the frequency of the interference wave is present within the frequency range to be searched at the time of tuning, the control unit 91 attempts to change the search algorithm, so that there is a possibility that tuning is performed preferably while passing through the frequency of the interference wave is avoided by changing the search algorithm. Accordingly, according to the reception apparatus of the present disclosure, a tuning process capable of avoiding the searched interference is possible, and preferable reception capable of avoiding the influence of the interference as much as possible is possible.

5. Modification Example

The arrangement number of tuner units shown in FIG. 1 is intended to show an example, and tuner units of other numbers may be disposed. Further, the examples of the search algorithms described in FIGS. 5 to 10 are intended to show only an example of a suitable algorithm, and other search algorithms may be prepared and be a candidate at the time of selecting a search algorithm.

Further, in the search process example of the interference wave that is described in the flowchart of FIG. 3, the control unit 91 is intended to perform the search of the interference wave at a relatively long period such as a few hours. In contrast, when there is an unused tuner unit, the search of the interference wave may be performed at any time. Further, it is also possible to variably set the period for performing the search of the interference wave depending on the occurrence of an interference wave in the past. For example, when the frequency of the interference wave is stored in the memory 92, the unused tuner unit may search as to whether or not the interference wave of the frequency occurs continuously, under the control of the control unit 91.

Further, as the case where the reception apparatus is mounted for example, on a mobile device, when the status of the interference wave constantly changes, the interference wave may be searched continuously using the unused tuner unit.

Further, in the example shown in FIG. 1, each of the tuner units 10 to 80 is a tuner unit to which a signal received by a single antenna 94 supplied. In contrast, for example, each tuner unit may include both of a tuner which receives terrestrial broadcast signals and a tuner which receives satellite broadcast signals, so that a plurality of antennas may also be connected thereto. Alternatively, a tuner unit of a first group among a plurality of tuner units may be a tuner unit which receives terrestrial broadcast signals and a tuner unit of a second group thereof may be a tuner unit which receives satellite broadcast signals.

Further, the example shown in FIG. 1 is applied to the control of the tuner unit which receives television broadcast signals. In contrast, the process of the present disclosure may be applied to various reception apparatuses including a plurality of tuner units which receive wireless transmission signals and wire transmission signals other than the television broadcast signals.

In addition, the present disclosure may have the following configurations.

(1)

A reception apparatus including: a plurality of reception circuits that receive transmission signals, a plurality of local oscillation circuits that respectively supply the plurality of reception circuits with local oscillation signals, and a control unit that controls tunings in the plurality of reception circuits, and when at least one reception circuit among the plurality of reception circuits is not used to receive the transmission signals, searches for an interference wave using the unused reception circuit.

(2)

The reception apparatus according to (1), in which the control unit stores a frequency of the interference wave which is searched, and when a search of transmission signals is performed in any one of the reception circuits, the control unit performs a tuning in which passing through the frequency of the interference wave is avoided.

(3)

The reception apparatus according to (2), in which the control unit performs a tuning in which passing through the frequency of the interference wave is avoided, by changing a search algorithm at the time of tuning.

(4)

The reception apparatus according to any one of (1) to (3), in which the control unit periodically performs a search of the interference wave.

(5)

Electronic equipment including: a plurality of reception circuits that receive transmission signals, a plurality of local oscillation circuits that respectively supply the plurality of reception circuits with local oscillation signals, a control unit that controls tunings in the plurality of reception circuits and when at least one reception circuit among the plurality of reception circuits is not used to receive the transmission signals, searches for an interference wave using the unused reception circuit, and a processing unit that processes signal which are received in the plurality of reception circuits.

It should be understood by those skilled in the art that various modifications, combinations, sub-combinations and alterations may occur depending on design requirements and other factors insofar as they are within the scope of the appended claims or the equivalents thereof.

What is claimed is:

1. A reception apparatus comprising:
   a plurality of reception circuits that receive transmission signals;
   a plurality of local oscillation circuits that respectively supply the plurality of reception circuits with local oscillation signals; and
   a control unit that controls tunings in the plurality of reception circuits, wherein, when at least one reception circuit among the plurality of reception circuits is not used to receive the transmission signals, the control unit searches for an interference wave using the unused reception circuit and stores a frequency corresponding to the interference wave, and in accordance with a tuning request corresponding to a transmission signal, the control unit causes at least one of the reception circuits to search a frequency range corresponding to the transmission signal such that the frequency corresponding to the interference wave is avoided.

2. The reception apparatus according to claim 1, wherein the control unit causes the at least one of the reception circuits to search the frequency range corresponding to the transmission signal such that the frequency corresponding to the interference wave is avoided by changing a search algorithm.

3. The reception apparatus according to claim 1, wherein the control unit periodically performs a search of the interference wave.

4. The reception apparatus according to claim 1, wherein the frequency corresponding to the interference wave is within the frequency range searched by the at least one of the reception circuits in accordance with the tuning request.

5. The reception apparatus according to claim 1, wherein the control unit determines how many reception circuits of the plurality of reception circuits are configured to receive transmission signals.

6. The reception apparatus according to claim 1, wherein the control unit, using the unused reception circuit, searches for the interference wave in a frequency band corresponding to the frequency range searched by the at least one of the reception circuits in accordance with the tuning request.

7. Electronic equipment comprising:
a plurality of reception circuits that receive transmission signals;
a plurality of local oscillation circuits that respectively supply the plurality of reception circuits with local oscillation signals;
a control unit that controls tunings in the plurality of reception circuits wherein, when at least one reception circuit among the plurality of reception circuits is not used to receive the transmission signals, the control unit searches for an interference wave using the unused reception circuit and stores a frequency corresponding to the interference wave, and in accordance with a tuning request corresponding to a transmission signal, the control unit causes at least one of the reception circuits to search a frequency range corresponding to the transmission signal such that the frequency corresponding to the interference wave is avoided; and
a processing unit that processes signal which are received in the plurality of reception circuits.

8. The electronic equipment according to claim 7, wherein the control unit causes the at least one of the reception circuits to search the frequency range corresponding to the transmission signal such that the frequency corresponding to the interference wave is avoided by changing a search algorithm.

9. The electronic equipment according to claim 7, wherein the control unit periodically performs a search of the interference wave.

10. The electronic equipment according to claim 7, wherein the frequency corresponding to the interference wave is within the frequency range searched by the at least one of the reception circuits in accordance with the tuning request.

11. The electronic equipment according to claim 7, wherein the control unit determines how many reception circuits of the plurality of reception circuits are configured to receive transmission signals.

12. The electronic equipment according to claim 7, wherein the control unit, using the unused reception circuit, searches for the interference wave in a frequency band corresponding to the frequency range searched by the at least one of the reception circuits in accordance with the tuning request.

* * * * *